United States Patent [19]
Sramek et al.

[11] Patent Number: 5,864,365
[45] Date of Patent: Jan. 26, 1999

[54] ENVIRONMENTALLY CONTROLLED CAMERA HOUSING ASSEMBLY

[75] Inventors: Kurt W. Sramek, Peyton; John Tinsley, Colorado Springs, both of Colo.

[73] Assignee: Kaman Sciences Corporation, Colorado Springs, Colo.

[21] Appl. No.: 592,020

[22] Filed: Jan. 26, 1996

[51] Int. Cl.$^6$ .................................................. H04N 5/225
[52] U.S. Cl. ............................................................ 348/373
[58] Field of Search .................................. 348/373, 374, 348/375, 376; 62/3.7

[56] References Cited

U.S. PATENT DOCUMENTS

| | | | |
|---|---|---|---|
| 3,141,987 | 7/1964 | Altman | 313/17 |
| 3,919,597 | 11/1975 | Meacham | 315/382 |
| 4,485,407 | 11/1984 | Bohm et al. | 348/374 |
| 5,563,659 | 10/1996 | Bernhardt et al. | 348/373 |

*Primary Examiner*—Andrew I. Faile
*Assistant Examiner*—Tuan V. Ho
*Attorney, Agent, or Firm*—McCormick, Paulding & Huber

[57] ABSTRACT

A camera housing assembly for protecting a camera from potentially-damaging environmental conditions, such as high temperatures, humidity and corrosive air-borne particulates, has a housing and an internal heat sink received within the housing. The internal heat sink defines a hollow body extending in the elongated direction of the housing and forming an internal chamber for receiving the camera and for transferring heat away from the chamber and camera. A polymeric insulating material is disposed within an annular space formed between the internal heat sink and housing in order to thermally insulate the internal heat sink from the housing. A thermoelectric cooling device extends through an aperture formed in a wall of the housing, and is thermally coupled between the internal heat sink and an external heat sink mounted to an external wall of the housing for transferring heat from the internal heat sink to the external heat sink. An optically-reflective shroud is mounted to the external heat sink by a plurality of thermal-isolation mounts to thermally insulate the shroud from the external heat sink. The shroud extends over the top surfaces of the external heat sink and housing and extends downwardly adjacent to the sides of the housing in order to reflect radiant energy away from the housing assembly.

20 Claims, 2 Drawing Sheets

ENVIRONMENTALLY CONTROLLED CAMERA HOUSING ASSEMBLY

FIELD OF THE INVENTION

This invention relates to camera housings, and more particularly, to camera housings for protecting a camera from high temperature, humidity and/or corrosive environmental conditions.

BACKGROUND OF THE INVENTION

Video cameras are used for many applications ranging from security systems to various industrial uses such as monitoring and recording manufacturing operations. Many of these applications expose the camera to extreme environmental conditions, such as extreme temperatures, high humidity, corrosive elements and air-borne particles.

To protect the cameras from these conditions, they are typically mounted within an environmentally controlled housing. A common method of controlling the internal temperature of such housings in high temperature environments is to employ a heat sink alone or in combination with a mechanical cooling device, such as a fan or blower. The heat sink is adapted to transfer heat away from an internal chamber of the housing enclosing the camera. In situations where the use of a heat sink alone provides inadequate heat transfer, one or more fans may be mounted adjacent to the heat sink to blow air across the heat sink and thereby increase the rate of heat transfer from the internal chamber.

One drawback of using a fan and/or other cooling devices having moving mechanical parts is that they are susceptible to wear and premature failure in environments having high heat and humidity, air-borne particles, and/or other corrosive elements. The constant exposure of mechanical cooling devices to these types of environmental conditions may, over a relatively short period of time, corrode or clog bearings and other moving parts, requiring these parts to be frequently serviced or replaced.

Another prior art system of cooling the internal chamber of a camera housing assembly employs one or more pumps for pumping a cooling fluid through tubing or other fluid passageways disposed within the housing. One disadvantage of these types of systems is that they may require extensive and complex support equipment for each housing, and are therefore financially impractical, especially for applications that require a number of cameras mounted at various remote locations, such as security systems. In addition, the pumps are susceptible to wear and premature failure in environments having air-borne particulates and/or other corrosive elements.

SUMMARY OF THE INVENTION

Accordingly, it is an object of the present invention to provide a camera housing assembly that overcomes the drawbacks of the prior art.

It is another object to provide a reliable and low-maintenance camera housing assembly for high heat and humidity environmental conditions that controls the internal temperature of the housing assembly to sufficiently cool an internal chamber containing a camera without forming condensation within the chamber.

According to the present invention, a camera housing assembly for protecting a camera from potentially-damaging environmental conditions, such as high temperatures, humidity and corrosive air-borne particulates, comprises a housing and an internal heat sink mounted within the housing and defining an internal chamber for receiving the camera and for transferring heat away from the camera and chamber. Preferably, an approximately annular space is defined between the internal heat sink and housing which is filled with thermal insulation, such as a polymeric foam, in order to thermally insulate the internal heat sink and chamber from the housing. A solid-state cooling device, such as a thermoelectric or thermionic cooler, is coupled in thermal communication to the internal heat sink for transferring heat away from the internal heat sink and camera chamber. An external heat sink is mounted external to the housing and is coupled in thermal communication with the solid-state cooling device in order to dissipate the heat transferred by the cooling device from the internal heat sink and camera chamber. In addition, an optically-reflective shroud is mounted over the housing and external heat sink for reflecting radiant energy directed onto the housing and heat sink by, for example, direct sunlight and reflections off the ground and/or adjacent objects.

The solid-state cooling device is preferably coupled to a temperature-sensing switch for controlling the device's actuation, and is responsive to its ambient temperature to switch the cooling device on in response to a predetermined maximum temperature value and to switch the cooling device off in response to a predetermined minimum temperature value. Preferably, the predetermined minimum temperature value is above the ambient dew point for preventing condensation within the internal camera chamber.

The above and other objects and advantages of this invention will become more readily apparent when the following detailed description is read in conjunction with the accompanying drawings.

DETAILED DESCRIPTION OF A PREFERRED EMBODIMENT

Figure 1:
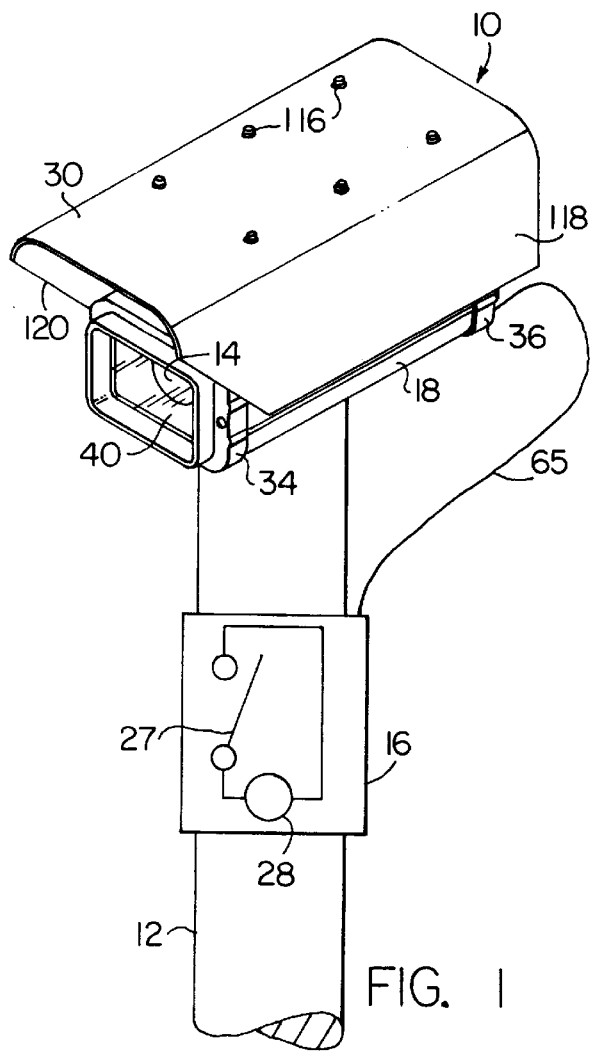
FIG. 1 is a perspective view of a preferred embodiment of a camera housing assembly of the present invention shown mounted on a post for protecting a security camera in high heat and humidity conditions.
Figure 3:
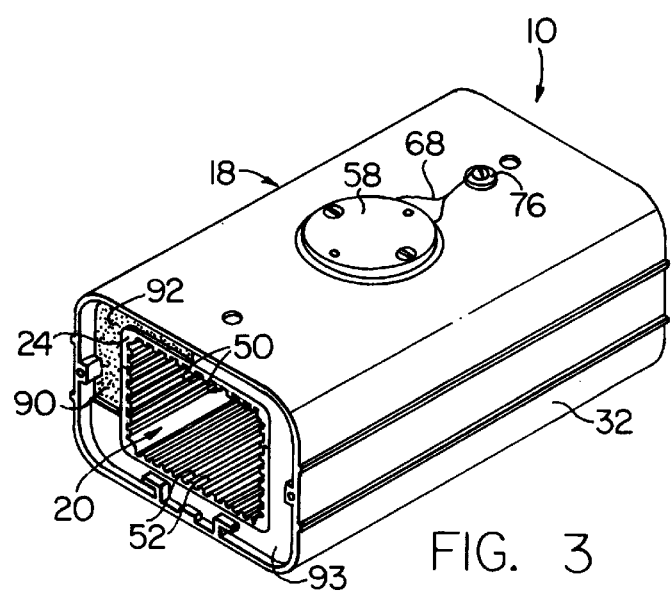
FIG. 3 is a perspective view of a portion of the camera housing assembly of FIG. 1 with parts removed for clarity and to show internal structure.

Referring to FIG. 1, a camera housing assembly 10 is shown mounted atop a post 12 having a CCD or video camera 14 mounted within the housing assembly and an electronic enclosure 16 mounted on the post below the housing assembly. As shown in FIG. 3, the housing assembly 10 includes a housing 18 having an internal chamber or enclosure 20 for receiving the camera 14 and which is environmentally controlled to protect the camera from high heat and humidity, air-borne particulates and other potentially damaging environmental conditions.

Figure 2:
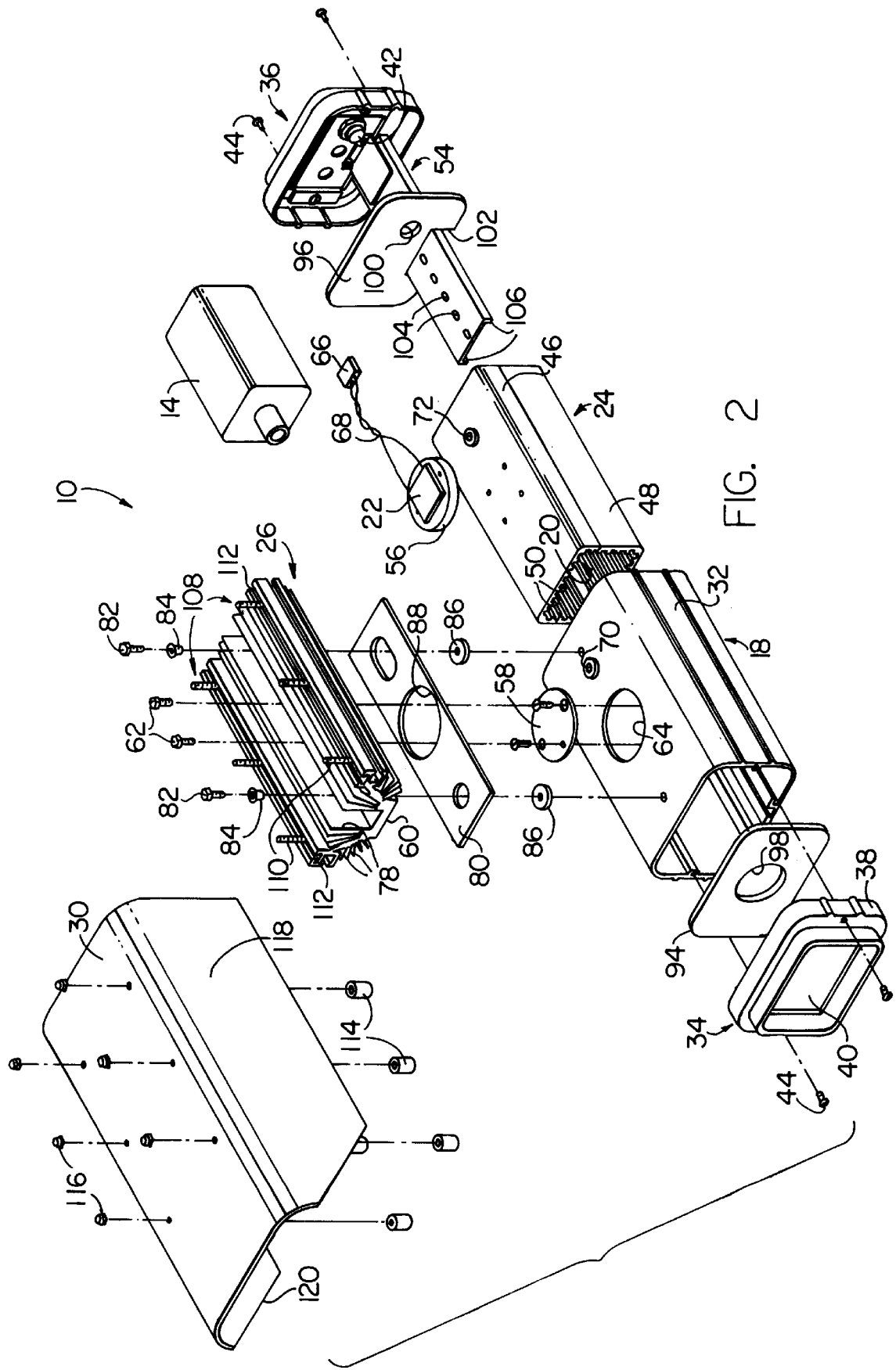
FIG. 2 is an exploded perspective view of the camera housing assembly of FIG. 1.

As indicated in FIG. 2, a solid-state thermoelectric or thermionic cooling device 22 is thermally coupled between an internal heat sink 24 defining the internal camera chamber 20 and received within the housing 18, and an external heat sink 26 mounted to the top of the housing 18. The cooling device 22 maintains the temperature of the internal chamber 20 within a predetermined range by controlling the heat transfer between the internal and external heat sinks 24 and 26, respectively, and thus the transfer of heat away from the internal chamber. As shown schematically in FIG. 1, the actuation of the cooling device 22 is controlled by a temperature-sensing switch 27 which is connected in series with a d.c. power source 28. The thermal switch 27 is programmed to close when the ambient temperature within the internal chamber 20 reaches a predetermined high temperature value, and to open when the temperature within the internal chamber reaches a predetermined low temperature value. In accordance with the present invention, the predetermined low temperature is above the ambient dew point to prevent condensation within the housing assembly 10.

As is described further below, thermal insulation is disposed within an annular space defined between the internal heat sink 24 and the housing 18, and between the external heat sink 26 and the housing. In addition, an optically-reflective shroud 30 is mounted over the external heat sink 26 and extends over the top and sides of housing 18 to reflect direct radiant energy from the sun and any reflections off the ground and/or adjacent objects.

As shown in FIG. 2, the housing 18 defines a hollow, longitudinally-extending body portion 32 which is open at its forward and rearward ends, and is approximately rectangular in cross section. A forward end cap 34 is adapted to be attached to the forward end of the housing, and a rearward end cap 36 is adapted to be attached to the rearward end of the housing to close each end. In the preferred embodiment, the housing body 32 is formed of aluminum to provide light weight structural strength, but may equally be formed from other suitable materials. The forward end cap 34 comprises a polymeric frame 38 defining a rectangular opening for receiving a transparent window 40 mounted along its periphery to the frame. The window 40 is preferably made of glass, Plexiglas, or like transparent material for permitting the camera 14 mounted within the chamber 20 to monitor any objects or activities within its field of view. The polymeric rear end cap 36 includes at least one electrical coupling 42 for connecting electrical power and communication cabling to the camera and cooling device, as is described further below. The end caps 34, 36 are attached to the open ends of the housing body 32 by suitable fastening means 44, such as screws, clips or an adhesive. Preferably, the end caps 34, 36 are not hermetically sealed to the housing 18, but rather are attached as shown in order to permit the internal camera chamber 20 to breath.

As shown in FIG. 2, the internal heat sink 24 includes upper and lower portions 46 and 48, respectively, which are each generally u-shaped in cross section and are connected together along each side of the internal heat sink at a longitudinally-extending seam formed by a tongue-and-groove construction (not shown). Preferably, each tongue forms a snap or interference fit within the corresponding groove to secure the upper and lower portions 46 and 48 together. Alternatively, as will be recognized by those skilled in the pertinent art, other known means for connecting or fastening the upper and lower portions of the heat sink together may be employed. As shown in FIGS. 2 and 3, the inner surfaces of the internal heat sink 24 define a plurality of inwardly-projecting fins or ridges 50 which are laterally spaced relative to each other and extend along the longitudinal axis of the heat sink to thereby enhance the transfer of heat from the camera and inner cavity to the internal heat sink. The inner bottom surface of the internal heat sink 24 further defines a pair of longitudinally-extending grooves 52 laterally spaced relative to each other between adjacent heat fins for slidably receiving a slide 54 on which the camera 14 is mounted, as is described in further detail below. The upper and lower portions 46 and 48 of the internal heat sink are preferably made of black-anodized aluminum or a like thermally-conductive material to facilitate the transfer of heat from the camera and internal chamber to the internal heat sink.

As indicated in FIG. 2, the solid-state cooling device 22 is fixedly mounted between a bottom spacer 56 and a top spacer 58 to form a sandwich-like assembly. The top and bottom spacers are secured together by thermally-insulated fasteners, such as nylon screws, or other insulated attachment means in order to prevent thermal short circuiting of the cooling device. Preferably, the interface between the cooling device and each spacer is coated with thermal grease to enhance the thermal conductivity between the cooling device and spacers. In addition, an electrical grade RTV silicon (room temperature vulcanizing) is applied to the periphery of the cooling device 22 and the spacers 56 and 58 in order to seal the cooling device from humidity.

As further indicated in FIG. 2, the bottom spacer 56 is secured to the top wall of the internal heat sink 24 by a plurality of screws or like fasteners, and the top spacer 58 is similarly secured to a base portion 60 of the external heat sink 26 by screws or other fasteners 62. As shown in FIGS. 2 and 3, an aperture 64 is formed through the top wall of the body portion 32 of the housing 18 for receiving the cooling device and spacer assembly. The top and bottom spacers 58 and 56, respectively, are preferably made of aluminum or other material exhibiting high thermal conductivity in order to facilitate the transfer of heat from the internal heat sink 24 to the external heat sink 26. In addition, thermal grease (not shown) is preferably applied to the interface between the bottom spacer 56 and internal heat sink 24, and to the interface between the top spacer 58 and external heat sink 26 to facilitate heat transfer.

The solid-state cooling device 22 may be one of several commercially available devices, such as the thermoelectric cooler manufactured by Marlow Industries, Inc., of Dallas, Tex., and typically comprises a layer of semiconductor material disposed between upper and a lower ceramic plates (details not shown). As shown in FIG. 1, the thermal switch 27 and d.c. power source 28 are connected through electrical cabling 65 to the electrical coupling 42 mounted on the rear end cap 36 of the housing assembly (see FIG. 2), and are in turn electrically connected through an electrical connector 66 and wire conductors 68 to the cooling device 30. The direction of heat transfer through the cooling device 30 is dependent upon the direction of current flow through its semiconductor material disposed between the ceramic plates (not shown). Accordingly, in order to cool the internal chamber 20, the power supply 28 is connected so that the lower plate mounted in engagement with the lower spacer 56 is the "cool side", and therefore absorbs heat from the internal heat sink 24, and the upper plate mounted in engagement with the upper spacer 58 is the "hot side", and therefore dissipates the heat transferred from the internal heat sink 24 to the external heat sink 26.

As shown in FIGS. 2 and 3, the wire conductors 68 are intertwined and threaded through a first opening 70 formed in the top wall of the housing body portion 32, and are in turn threaded through a second opening 72 formed in the top wall of the internal heat sink 24, which is aligned with the first opening upon insertion of the internal heat sink into the housing. As shown in FIG. 3, a rubber grommet 76 is inserted through the aligned openings 70 and 72 to prevent cutting or fraying of the wire conductors. Once the wire conductors 68 are threaded through the grommet 76 and aligned openings, the electrical connector 66 is attached to the ends of the wires, and RTV silicone, or like electrical-grade polymeric material, is applied to fill the opening in the grommet to thereby seal the grommet and secure the wire conductors in place.

In the preferred embodiment shown in FIG. 1, the d.c. power supply 28 and thermal switch 27 are disposed within the electronic enclosure 16 mounted on the post 12 below the housing assembly 10. The thermal switch 27 is preferably a programmable solid-state electronic switching circuit adapted to accurately monitor the temperature of the internal chamber 20 and energize a solid-state switch within a predetermined temperature range. The switching circuit includes one or more thermocouples or thermistors (not shown) mounted within the internal chamber 20 for sensing the temperature of the internal chamber. As mentioned above, the thermal switch 27 is programmed to close and thereby energize the cooling device 22 when the temperature within the internal chamber 20 exceeds a predetermined maximum temperature value, and to open and de-energize the cooling device in response to the temperature within the internal chamber reaching a predetermined minimum value. As also mentioned above, the predetermined minimum temperature value is above the ambient dew point in order to prevent condensation within the internal chamber.

The embodiment of the present invention illustrated is currently planned for installation in the high-temperature and high-humidity environment of a middle eastern sea coast desert having peak ambient temperature of approximately 130° Fahrenheit and humidity exceeding 90%. In addition, both direct sun light or radiant energy and reflections off the sand, concrete or other ground material generate additional thermal loads. In these conditions, and with the embodiment of the present invention illustrated, an acceptable predetermined maximum temperature for the internal chamber 20 is approximately 110° F. and an acceptable predetermined minimum temperature for the chamber is approximately 80° F.

In an alternative embodiment, the thermal switch 27 or other means for sensing the temperature of the internal chamber 20, such as a thermostat having mechanical contacts, may be disposed within the internal chamber of the housing assembly 10 rather than being mounted within the electronic enclosure on the post. Also if desired, the d.c. power supply 28 may be combined with the thermal switch 27 into a single unit, such as the one manufactured by Marlow Industries, Inc. of Dallas, Tex.

As shown in FIG. 2, the external heat sink 26 defines a plurality of longitudinally-extending fins 78 projecting upwardly and outwardly from the base portion 60. An insulating gasket 80 is interposed between the base portion 60 of the external heat sink and the top surface of the housing body portion 32, and the external heat sink is secured to the housing by a pair of screws 82. The gasket 80 is preferably made of a rubber-like sheet material, such as EPDM rubber sheeting, or other thermally-insulating material in order to thermally isolate the external heat sink 26 from the housing 18. Although the thickness of the gasket 80 may be adjusted depending upon the active and passive heat loads and insulating requirements of a particular installation, in the embodiment of the invention illustrated the rubber sheet is approximately ¼ inch thick. As also shown in FIG. 2, each of the screws 82 is received within a respective screw insulator 84 disposed within the base portion of the heat sink, and a respective insulating washer 86 interposed between the base portion and the housing to further prevent heat transfer between the external heat sink and housing. The screw insulators 84 and washers 86 are preferably made of a polymeric material, such as nylon, or other material providing like thermal insulation.

As also shown in FIG. 2, the insulating gasket 80 defines a central aperture 88 for receiving the cooling device and spacer assembly upon attachment of the top spacer 58 to the base portion 60 of the external heat sink, as described above. As shown in FIG. 3, the cooling device 22 and internal heat sink 24 attached to the cooling device are supported within the housing 18 so as to define an approximately annular space 90 between the internal heat sink and housing body portion 32. The annular space 90 is filled with an insulating material 92, preferably a thermally-insulating polymeric material, such as urethane foam, to provide thermal insulation between the internal heat sink and housing. As shown typically in FIG. 3, a potting compound 93, such as the compound sold under the trademark "Devcon Flexane", is applied to the front and rear faces of the foam insulation in order to cover and protect the foam and provide additional structural support.

As shown in FIG. 2, a front insulating partition 94 is mounted over the front end of the housing 20 and secured in place by attachment of the front end cap 34 to the housing. Similarly, a rear insulating partition 96 is mounted over the rear end of the housing 18 and is secured in place by attachment of the rear end cap 36 to the housing. Each insulating partition is made of an optically-reflective-insulating sheet material, such as the aluminum foil insulation sold under the trademark "Reflectix", to further insulate the internal camera chamber 20 from the housing 18. Although the thickness of each insulating partition may be adjusted depending upon the thermal loads of each particular installation, in the embodiment of the present invention illustrated each partition is approximately ¼ inch thick. As also shown in FIG. 2, the front insulating partition 94 defines a camera aperture 98 which is of sufficient diameter so as to provide a full field of view for the lens of the camera 14. The rear insulating partition 96 defines a circular aperture 100 for receiving the electrical connector 42, and defines a rectangular notch 102 along its lower edge for receiving the camera-mounting slide 54.

As shown in FIG. 2, the slide 54 is fixedly mounted on one end to the rear end cap 36 and longitudinally extends into the internal camera chamber 20 upon attachment of the rear end cap to the housing 18 for mounting the camera 14 within the internal chamber. Accordingly, the slide 54 defines a plurality of apertures 104 spaced relative to each other in the elongated direction of the slide for receiving screws or like fasteners for attachment of the camera 14 to the slide. The slide 54 further defines a pair of downwardly-extending runners 106 which are received within the corresponding grooves 52 (see FIG. 3) formed in the bottom wall of the internal heat sink 24 for guiding the slide into the internal heat sink 24 and properly positioning the camera 14 within the internal camera chamber 20.

The reflective shroud 30 is mounted to the external heat sink 26 by a plurality of thermal isolation mounts 108 spaced relative to each other in the elongated direction of the heat sink and projecting upwardly from the fins 78 so as to provide a space between the heat sink and shroud to permit sufficient air flow therethrough. Each isolation mount 108 comprises a threaded fastener 110 received within one of two u-shaped grooves 112, each formed in a respective side of the external heat sink and extending in its elongated direction. Each fastener 110 is received within a respective cylindrical stand-off 114 which is dimensioned in its elongated direction so as to define the desired space between the reflective shroud and the external heat sink. In the embodiment of the present invention illustrated, each stand-off 114 is approximately ¾ inch long. Accordingly, the shroud is supported on the stand-offs 114 so that the ends of the threaded fasteners 110 project through corresponding apertures formed in the top wall of the shroud, and the shroud is secured in place by attaching nuts 116 to the ends of the fasteners. Each stand-off 114 is preferably made of a thermally-insulating material, such as G-10, phenolic or like polymeric material, in order to thermally isolate the shroud from the external heat sink.

The outer surface 118 of the shroud 30 is optically reflective for reflecting sun light or like radiant energy away from the housing assembly. Accordingly, the shroud 30 is preferably formed of stainless steel or like optically-reflective sheet material which resists corrosion, high-humidity and/or other potentially damaging environmental conditions. As shown in FIG. 1, the shroud 30 is shaped so as to cover the top of the external heat sink 26 and other components of the housing assembly, and extends downwardly adjacent to the sides of the housing 18 so as to block both direct sun light and reflections from the ground and/or adjacent objects. As also shown, the forward edge 120 of the side walls of the shroud 30 slope rearwardly from the top of the shroud toward the bottom of each side in order to prevent the shroud from interfering with the peripheral view of the camera 14.

Accordingly, in the operation of the housing assembly of the present invention, when the temperature within the internal camera chamber 20 reaches the maximum temperature value, which in the preferred embodiment is approximately 110° F., the solid-state switch 27 automatically actuates the thermoelectric cooling device 22, which in turn pumps or transfers heat away from the internal heat sink 24 to the external heat sink 26. This in turn lowers the temperature of the internal camera chamber 20 through heat transfer from the camera and internal chamber to the internal heat sink 24. The foam insulation 92 between the internal heat sink 24 and housing 18, and the optically-reflective insulated partitions 94, 96 disposed between the end caps 34, 36 and the housing, encapsulate and thereby thoroughly insulate the camera chamber from both the housing 18 and its external environment. This thermally-insulated enclosure reduces the passive thermal load on the camera chamber (i.e., the heat and direct radiant energy from the sun and reflections off the ground), and thereby permits the thermoelectric cooler 22 to dissipate the active thermal load (i.e., the heat generated by the camera 14) and maintain the temperature of the camera chamber within a desired temperature range. As shown in FIG. 2, the external heat sink 26 extends along substantially the entire longitudinal extent of the housing 18, and thus the external heat fins 78 provide a relatively substantial amount of surface area, particularly in comparison to the surface areas of the other components of the housing assembly, in order to facilitate the heat transfer away from the camera and internal camera chamber.

As shown in FIG. 1, the optically-reflective shroud 30 is spaced above the external heat sink 26 in order to permit air flow between the shroud and heat sink and thereby facilitate the transfer of heat away from the heat sink; in addition, the gasket 80 disposed between the external heat sink and housing 18 functions to prevent the transfer of heat from the external heat sink to the housing. The optically-reflective shroud 30 and the reflective partitions 94 and 96 covering the ends of the housing 18 reflect both direct sun light and reflections off the ground and/or adjacent objects away from the housing assembly in order to further reduce the passive thermal loads on the thermoelectric cooler and internal and external heat sinks. When the temperature within the camera chamber 20 reaches the predetermined minimum temperature value, which in the preferred embodiment illustrated is approximately 80° F., the solid-state switch 27 opens and thereby de-energizes the thermoelectric cooler in order to prevent condensation within the camera chamber. The end caps 34, 36 are preferably each mechanically fastened to the respective open end of the housing 18 with a neoprene gasket or like seal (not shown) disposed between the end caps and the housing in order to minimize the amount of airflow, and prevent air-borne particulates from flowing through the housing and internal camera chamber.

One advantage of the camera housing assembly of the present invention, is that it does not comprise moving parts, such as fans or fluid pumps as found in prior art apparatus, but rather employs a solid-state cooling device, along with the internal and external heat sinks, optically-reflective shroud and thermal insulation, to efficiently and effectively control the temperature of the camera chamber. The thermal switch 27 is also preferably a solid-state switch, as described above, in order to avoid moving parts. Accordingly, the present invention provides a cost-effective and low-maintenance housing assembly for protecting a CCD or like camera in high heat, high humidity and corrosive environmental conditions. In addition, the thermally-insulated enclosure and solid-state cooling device of the present invention insulate the camera chamber from rapid temperature changes, and gradually decrease the chamber temperature over a longer period of time, thus protecting the camera and/or other electronic components from thermal shock.

Although the invention has been shown and described with respect to an exemplary embodiment, it should be understood by those skilled in the art that the foregoing and various other changes, omissions, and additions in the form and detail thereof may be made without departing from the spirit and scope of the invention.

What is claimed is:

1. A camera housing assembly for protecting a camera mounted within the housing assembly from the environment external to the housing assembly, comprising:

a housing for receiving a camera, the housing having a tubular body enclosing all sides of the camera;

an internal heat sink mounted within the housing between the camera and the housing for transferring heat away from the camera, and defining an approximately annular space between the internal heat sink and housing;

an insulating medium disposed within the approximately annular space between the internal heat sink and the housing and thermally insulating the internal heat sink from the housing;

a solid-state cooling device coupled in thermal communication to the internal heat sink for transferring heat away from the internal heat sink;

an external heat sink coupled in thermal communication with the solid-state cooling device for transferring heat away from the cooling device; and an optically-reflective shroud mounted over the housing and external heat sink for reflecting radiant energy directed onto the housing and heat sink.

2. A camera housing assembly as defined in claim 1, further comprising:

a temperature-sensing switch connected to the solid-state cooling device for controlling its actuation, the switch being responsive to its ambient temperature to switch the cooling device on in response to a predetermined maximum temperature value and to switch the cooling device off in response to a predetermined minimum temperature value.

3. A camera housing assembly as defined in claim 2, wherein the predetermined minimum temperature value is above the ambient dew point for preventing condensation within the housing.

4. A camera housing assembly as defined in claim 2, wherein the temperature-sensing switch is an electrical solid-state switching device.

5. A camera housing assembly as defined in claim 1, wherein the external heat sink is mounted on the housing, and the housing assembly further comprises a layer of insulating material disposed within the interface between the external heat sink and housing.

6. A camera housing assembly as defined in claim 1, wherein the housing defines an open end, and the housing assembly further comprises an insulating partition mounted over the open end of the housing and defining an aperture for permitting the camera to view objects therethrough and defining an optically-reflective exterior surface for further insulating the camera chamber from the environment external to the housing assembly.

7. A camera housing assembly as defined in claim 1, wherein the optically-reflective shroud extends over the housing and heat sink so as to cover the top surfaces of the housing and heat sink, and extends downwardly adjacent to at least two sides of the housing and external heat sink to reflect radiant energy away from the housing assembly.

8. A camera housing assembly as defined in claim 7, further comprising at least one thermal-isolation mount for supporting the optically-reflective shroud over the housing and external heat sink and preventing heat transfer between the shroud and external heat sink, and defining a passageway between the shroud and external heat sink for the flow of air therethrough.

9. A camera housing assembly as defined in claim 1, wherein the internal heat sink defines a hollow elongated body received within the housing and defining an internal chamber for receiving the camera, and further defining a plurality of heat fins for facilitating heat transfer away from the camera and internal chamber, the internal heat sink being insulated from the housing.

10. A camera housing assembly as defined in claim 1, wherein the external heat sink is mounted to an external wall of the housing and defines a plurality of heat fins projecting outwardly away from the housing for facilitating heat transfer between the internal heat sink, cooling device and external heat sink.

11. A camera housing assembly as defined in claim 1, wherein the solid-state cooling device is a thermoelectric cooler.

12. A camera housing assembly as defined in claim 1, wherein the insulating medium is a polymeric medium.

13. A camera housing assembly for protecting a camera mounted within the housing assembly from the environment external to the housing assembly, comprising:

a housing, having a tubular body enclosing all sides of the camera;

first means mounted within the housing defining an internal camera chamber for receiving the camera and for transferring heat away from the camera and internal chamber, and defining an approximately annular space between the first means and the housing;

means for insulating disposed within the approximately annular space between the first means and housing to insulate the first means from the housing;

a solid-state cooling device coupled in thermal communication with the first means for transferring heat away from the first means;

second means mounted external to the housing and solid-state cooling device for transferring heat away from the cooling device; and third means mounted over the housing and second means for reflecting radiant energy from the sun and reflections from the ground or adjacent objects away from the housing assembly.

14. A camera housing assembly as defined in claim 13, further comprising means for energizing the cooling device in response to the temperature of the internal camera chamber reaching a predetermined maximum temperature and for de-energizing the cooling device in response to the internal camera chamber reaching a predetermined minimum temperature.

15. A camera housing assembly as defined in claim 14, wherein the predetermined minimum temperature is above the ambient dew point for preventing condensation within the internal camera chamber.

16. A camera housing assembly as defined in claim 13, wherein the means for insulating is an internal heat sink mounted within the housing and defining a hollow elongated body forming the internal camera chamber.

17. A camera housing assembly as defined in claim 16, wherein the internal heat sink defines a plurality of heat fins projecting inwardly toward the camera received within the camera chamber for facilitating heat transfer away from the camera and internal chamber, the internal heat sink being insulated from the housing.

18. A camera housing assembly as defined in claim 13, wherein the second means includes an external heat sink mounted to an exterior wall of the housing and defining a plurality of heat fins for transferring heat away from the internal heat sink and cooling device.

19. A camera housing assembly as defined in claim 13, wherein the third means includes an optically-reflective shroud substantially covering the top surfaces of the housing and second means and extending downwardly adjacent to at least two sides of the housing for reflecting radiant energy away from the housing assembly.

20. A camera housing assembly as defined in claim 13, further comprising means mounted over an open end of the housing for reflecting radiant energy away from the respective end of the housing, and defining a viewing aperture for permitting the camera to view objects therethrough.

* * * * *